United States Patent [19]
McAndrew et al.

[11] Patent Number: 5,441,772
[45] Date of Patent: Aug. 15, 1995

[54] PROTECTING CARBON STEEL FROM CORROSION WITH NONCONDUCTING POLY(ANILINE)

[75] Inventors: Thomas P. McAndrew; Andrew G. Gilicinski; Lloyd M. Robeson, all of Macungie, Pa.

[73] Assignee: Air Products and Chemicals, Inc., Allentown, Pa.

[21] Appl. No.: 129,699

[22] Filed: Sep. 29, 1993

[51] Int. Cl.⁶ .............................................. B05D 7/14
[52] U.S. Cl. .................. 427/388.1; 427/386; 427/388.2
[58] Field of Search .................... 427/388.2, 386, 388.1

[56] References Cited

U.S. PATENT DOCUMENTS

| | | | |
|---|---|---|---|
| 4,820,595 | 4/1989 | MacDiarmid et al. | 429/43 |
| 4,855,361 | 8/1989 | Yaniger et al. | 525/436 |
| 5,006,278 | 4/1991 | Elsenbaumer | 427/385.5 |
| 5,162,135 | 11/1992 | Gregory et al. | 427/342 |
| 5,176,851 | 1/1993 | Barry, Jr. | 427/385.5 |
| 5,227,092 | 7/1993 | Han | 252/500 |
| 5,294,694 | 3/1994 | Epstein et al. | 427/508 |

OTHER PUBLICATIONS

G. Mengoli, et al, "Anodic Synthesis of Polyanilene Coatings onto Fe Sheets" of Appl. PolySci, vol. 26, (1981) John Wiley & Sons, Inc., pp. 4247–4257. (No month available).

G. Mengoli, et al, "Anodic Synthesis of Sulfur-Bridged Polyanilene Coatings onto Fe Sheets", of Appl. Poly Sci, vol. 28, (1983) John Wiley & Sons, Inc., pp. 1125–1136. (No month available).

M. Mirsiani, et al, "Improved Poly(aniline) Coatings by In Situ Electropolymerization", of Appl. Poly. Sci. vol. 29 (1984) John Wiley & Sons, pp. 4433–4438.

D. W. DeBerry, "Modification of the Electrochemical and Corrosion Behavior of Stainless Steels with an Electroactive Coating", Selectro. Chem., Electrochemical Science and Technology, (1985) p. 1022 no month available.

G. Troch-Nagels, et al, "Electron Conducting Organic Coating of Mild Steel by Electropolymerization", of Appl. Electrochemistry 22, (1992) pp. 756–764. No month available.

Guy C. Mattson, "The Synthesis of Conducting Polymers for Corrosion Prevention", NASA/ASEE Summer Faculty Research Fellowship, 1988. p. 118., Aug.

Karen G. Thompson, et al, "Corrosion—Protective Coatings from Electrically Conducting Polymers," Technology 2001, Dec. 1991.

F. C. Haung, et al, "Electrically Conductive Membranes: Synthesis and Applications," Polymeric Materials: Science and Engineering, 61, pp. 895–899 (1989). No month available.

*Primary Examiner*—Diana Dudash
*Attorney, Agent, or Firm*—Mark L. Rodgers; William F. Marsh

[57] ABSTRACT

Carbon steel substrates are protected from corrosive environments by a coating of nonconductive poly(aniline) which has been chemically prepared and cast onto the substrate from solution. The coating can also include other polymers which are miscible with the poly(aniline) but do not protonate it so as to make it conductive. Such polymers can include polyimides, epoxies, and urethane linked diisocyanates, among others. In these blends, a weight composition of at least 5% poly(aniline) to the other polymer is preferred. Overall, the nonconductive form of polyaniline has been found to be more effective in this service than the conductive form. Air oxidation of the poly(aniline) coating before exposure to a corrosive environment enhances the benefits.

9 Claims, No Drawings

PROTECTING CARBON STEEL FROM CORROSION WITH NONCONDUCTING POLY(ANILINE)

FIELD OF THE INVENTION

This invention relates to a method of protecting carbon steel from corrosion with a film of nonconducting poly(aniline). In another aspect it relates to a carbon steel substrate in a corrosive environment protected with a polymeric coating containing nonconducting poly(aniline).

BACKGROUND OF THE INVENTION

The corrosion of carbon steel (also known as mild steel) is an enormous problem throughout the world. Stainless steels are too costly to use where most structural steel is required so that considerable effort has been spent to find ways of protecting carbon steel from corrosion. Many kinds of treatments, paints and coatings have been developed over the years to address this problem, but those that work well are expensive. For a coating to protect carbon steel successfully against corrosion, it should restrict access of water, oxygen and other oxidants to the steel surface. In some instances, corrosion inhibitors, such as zinc powder or organic amines, are used. The search for new solutions to this problem has continued unabated for several decades.

Recently considerable interest has been shown in the use of electrically conductive polymers in corrosion protection. One of such polymers is poly(aniline) which, when protonated, exhibits very interesting properties as an electrical conductor (specifically, electrical conductivity as high as about 5 S/cm—well into the metallic regime). Experience with this polymer in corrosion prevention, however, has not been encouraging.

In 1981, Mengoli, et al., published a paper in the Journal of Applied Polymer Science, 26, 4247, "Anodic Synthesis of Poly(aniline) Coatings onto Fe Sheets" evaluating anodic synthesis of poly(aniline) coatings onto iron sheets, and concluding that the protection afforded by such coatings, although not negligible, was limited by microporosity and that any interest in such coatings for their protective features would depend upon finding a way to overcome this handicap. Later work by these authors reported in the Journal of Applied Polymer Science, 28, 1125 (1983) evaluated a sulfur-bridged form of poly(aniline) which had limited utility owing to high electrical resistance (i.e., low electrical conductivity), low resistance to chemicals, solvents and aggressive environments.

Musiani, "Improved Poly(aniline) Coatings by in Situ Electropolymerization", Journal of Applied Polymer Science, 29, 4433–38 (1984) confirmed that the coatings described by Mengoli, et al. were inadequate and provided little protection. Further work with electrochemical formation of films from N-(2-hydroxyethyl)aniline showed that the homopolymers made poor coatings because of high porosity and lack of homogeneity but copolymers with a nonionic surfactant gave improved results.

DeBerry, "Modification of the Electrochemical and Corrosion Behavior of Stainless Steels with an Electroactive Coating", Journal of the Electrochemical Society, 132, 1022 (1985) presented a more optimistic view of electroactive poly(aniline) coatings with respect to protection of stainless steel. The coatings evaluated were applied electrochemically using aniline in perchloric acid solution. The author states that PAn in its doped, i.e. conductive, form provides protection to stainless steel in acidic media. Note, however, that stainless steel, intrinsically, is more corrosion resistant than carbon steel. Thus, no direct inference can be made regarding what protection would be afforded to carbon steel by doped PAn. The author further states that a quantitative description of the corrosion protection is not possible due to interactions of variables involved and complexity of the passivation process. On the other hand, Troch-Nagels, "Electron Conducting Organic Coating of Mild Steel by Electropolymerization", Journal of Applied Electrochemistry, 22, 756–764 (1992) points out that on stainless steel, corrosion of the substrate is less compared to mild steel. Electropolymerized poly(aniline) films were found not to be sufficiently effective in providing corrosion protection for mild steel to be of commercial interest. This reference elucidates the theory that electron conducting films could serve as corrosion inhibitors for mild steel. Since corrosion is largely an electrochemical phenomenon, it should take place at the surface of the protecting film without involving the substrate. Only the protonated, doped form of poly(aniline) is said to be electrically conductive (1 to 5 S/cm) and suitable for the research. It was concluded that poly(aniline) films did not meet the requirements for mild steel protection.

A somewhat different approach is reported by Mattson, "The Synthesis of Conducting Polymers for Corrosion Prevention", Final Report on NASA Contract with the University of Central Florida, NASA-NGT-60002, N89-14159, 118–129 (1988). Poly(aniline) was made in an electrically conductive (i.e., doped) form suitable for grinding, sizing and suspension in a binder, such as epoxy or an acrylic latex, for evaluation as a coating to protect mild steel from corrosive environments. Conductivities reported for the doped poly(anilines) prepared were in the range of 0.6 to 10.5 S/cm. Testing of corrosion protection provided by such coatings was not pursued because of flawed samples marked by holes and voids in the coatings. Note that in this study, PAn was used only as a conductive filler, not as a reactive constituent.

More recently, Thompson, et al., "Corrosion-Protective Coatings from Electrically Conductive Polymers", Proceedings from Technology 2001, San Jose, Calif. (1991) reported some success with electrically conductive polymer coatings in the protection of metal surfaces from corrosion. Developed in a joint research effort of NASA at the Kennedy Space Center and the Los Alamos National Laboratory, these coatings involved electrically conductive forms of several polymers, including poly(aniline), which had been appropriately doped with additives serving as electron acceptors to increase conductivity of the polymer. These polymers were used by applying undoped, chemically prepared polymers to the steel surface and subsequently doping the coated surface to the conductive state. Poly(aniline) was determined to show the most promise. Doped poly(aniline) prepared chemically was converted to a nonconducting emeraldine base which was dissolved in an organic solvent and coated on steel, after which the coating was doped to the conductive state. The best dopants were tetracyanoethylene, zinc nitrate and p-toluenesulfonic acid. After doping, a top coat of standard, fully cured epoxy was applied to impart abrasion resistance. *Inside R & D,* 21, 4 (Jan. 22, 1992) reported this work as providing a corrosion barrier coating for steel made from an electrically conductive polymer which restricts the transfer of electrons from the iron in steel to the oxidizing environment. The coating was said to have two layers: an undercoat of conducting poly(aniline) on the steel and an epoxy top coat for durability. The bilayer coating was reported to be more effective in resisting corrosion than a coating with epoxy alone.

Meanwhile, in a different technology dealing with membrane separations, Huang, et al., "Electrically Conductive Membranes: Synthesis and Applications", Polymeric Materials: Science and Engineering, 61, 895-899 (1989) described the use of poly(aniline) in preparing electrically conductive membranes useful in separating aqueous solutions. Poly(aniline) and polypyrrole were used in chemically doped, electrically conductive forms on substrates of polypropylene and Teflon. The accessibility of the doped membranes to aqueous solutions was said to be greater than for the undoped membranes because of the hydrogen bonding and ionic nature of the doped conductive polymer. This observation was interesting to us because of our work in membrane separations and because it occurred to us that the permeability desired for a separating membrane is the opposite of what is sought in providing a corrosion protective barrier for steel.

SUMMARY OF THE INVENTION

We have discovered that improved protection from corrosion for carbon steel is provided by applying to the surface of the steel a coating of nonconducting poly(aniline) and thereafter exposing the coated steel surface to a normally corrosive environment while maintaining the poly(aniline) in a nonconductive form. The poly(aniline) coating is applied from a solution of the polymer in the base form. The base form is prepared by the deprotonation of the protonated form, which is made preferably by chemical polymerization of aniline in aqueous solution. This method provides a carbon steel substrate coated with a protective film of nonconducting poly(aniline) while it is exposed to an environment which is corrosive to the unprotected steel. Air oxidation of the poly(aniline) film before exposure to a corrosive environment further improves the protective properties of the coating.

As a further embodiment of our invention, carbon steel is coated with a protective film which contains nonconducting poly(aniline) and another polymer miscible and/or reactive with the poly(aniline) without protonating it to make it conductive. Such other materials include, for example, polyimides, epoxy resins, styrene/acrylic acid copolymer, urethane linked diisocyanates, and the like.

DETAILED DESCRIPTION OF THE INVENTION

Although poly(aniline), PAn, has been known for over a century, it has been only in the last decade or so that interest has been shown in this material because of its electrically conductive properties. Likewise, it is well known how to make these polymers, both electrochemically by generating the polymer on an electrode and chemically in aqueous solution using a chemical initiator. For our invention we prefer the latter approach because the protective film is best when cast from solution onto the surface which it is to protect. Such a cast film should have significantly better pore resistance than an electrochemically grown coating.

The structure of PAn in its nonconductive form can be represented by the structural formula:

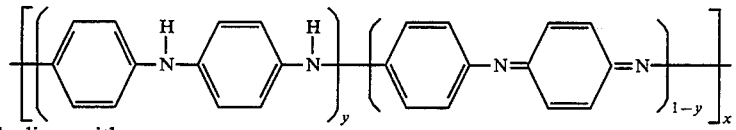

where normally "y" is 0, 1 or 0.5 and "x" is indicative of molecular weight. When y is 0.5, the polymer is referred to as being in the emeraldine form and it is in this form that PAn can be protonated to become electrically conductive. This operation is usually referred to as "doping" the polymer.

It should be understood that electrical conductivity is a relative term since even insulators exhibit some measurable conductivity. For example, while copper under ambient conditions has an electrical conductivity, E.C., of about $5 \times 10^5$ S/cm, sulfur which is a good insulator has an E.C. of about $5 \times 10^{-18}$. The emeraldine base form of PAn has an E.C. of about $10^{-9}$, but when protonated has an E.C. of 1 to 5. This is recognized in the art as the conductive form of PAn while the emeraldine base form is considered nonconductive. For the purposes of this invention, we intend the terms "nonconductive" or "nonconducting" as applied to PAn to mean having an E.C. which is not greater than about $10^{-2}$ S/cm, and preferably not greater than about $10^{-5}$ S/cm.

The nonconducting PAn used in our invention can also be distinguished from the conducting or protonated PAn chemically. Elemental analysis of the nonconducting PAn will show that it is made up essentially of carbon, hydrogen and nitrogen, while the protonated form contains anions, such as $Cl^-$, as counter ions to maintain the charge neutrality. Solubility is yet another way to distinguish our nonconducting PAn from the conducting form. Emeraldine base PAn is soluble in N-methyl-2-pyrrolidinone, NMP, up to about 5 percent by weight while the protonated, highly conductive, emeraldine is insoluble, that is, about 0 percent solubility.

While it is preferable to use unsubstituted aniline in making the PAn to be used in this invention, the aniline can be substituted in the 2, 3, 5 and 6 positions on the ring with any group which does not interfere with the water solubility or polymerization of the monomer or with the solvent solubility of the base form of the polymer. Solvents normally used are NMP and dimethylformamide, DMF. For example, an alkoxy group having 1 to 6 carbons could be substituted for a hydrogen in the aniline molecule except on the nitrogen or in the 4-position of the ring. In other words, any substituents should not interfere with the processing of either the monomer or the polymer in preparing the protective film.

Applying the PAn to the carbon steel can follow any procedure known in the art since basically it involves simply flowing the solution of PAn in a suitable solvent over the steel surface and allowing the solvent to evaporate. Care should be taken to insure that the coating is continuous so as to restrict access of water, oxygen or other oxidants to the steel. The thickness of the films formed is the same as those generally found in the art and is governed by polymer concentration in the solution, method of application and number of coats applied.

We have also found that the pore resistance and, hence, effectiveness of the PAn film on the carbon steel surface can be improved by air oxidation prior to exposing the steel to a corrosive environment. This step can be carried out very easily by heating the coated surface in flowing air for a time at elevated temperature, for example, over 100° C. Usually a few hours to 2 or 3 days is sufficient. Such a treatment at 110° C. for about 3 days was quite effective. Such air oxidation does not materially alter the nonconductive character of the PAn but it does improve its solvent resistance. When immersed in NMP, untreated PAn film swelled considerably and imparted an opaque navy blue color to the NMP. After air oxidation, however, the PAn did not swell and imparted only a faint blue tint to the NMP as a result of dissolved material. While not to be bound by theory, it is believed that air oxidation imparts some crosslinking to the PAn film and thereby serves to prevent movement of electrolyte solution through the coating.

We have further discovered that definite advantages in corrosion protection can be realized by applying to the carbon steel surface a coating which contains nonconductive PAn blended with other polymer systems which are miscible with the PAn but do not protonate it so as to materially affect its electrical conductivity. These other polymer systems are those which by themselves can exhibit at least some minimal corrosion preventive properties when applied to a steel surface. Examples of such polymers include the polyimides, acrylic acid copolymers, epoxy polymers, polyurethanes, urethane linked diisocyanates, and the like. Examples of commercially available polyimides which are suitable include Kapton ML-5019 and ML-5069 of Dupont, Amoco Chemical's AI-10 and Torlon, and Ciba-Geigy's Matrimide 9725. A preferred polyimide is the amic acid form of the reaction product of pyromellitic dianhydride and oxydianiline. The PAn/polymer blends, depending upon the second polymer chosen, generally contain about 0.5 to 2 parts by weight of PAn per part of second polymer. At least 5%, and preferably at least 50%, by weight of the blend should be PAn. More than 2 parts of PAn per part of second polymer can be used, but then the benefits of using the second polymer may be diminished. The polymer blends are applied to the steel surface in the same manner as the PAn, by casting from solution, dispersion or spray coating.

Other advantages and features of our invention will be apparent to those skilled in the art from the following examples, which are meant to be illustrative only, and should not be construed to limit our invention unduly.

EXAMPLES

A method used to evaluate corrosion protection performance in these Examples is electrochemical impedance spectroscopy, EIS. This method uses principles of alternating current circuit theory to measure the pore resistance of polymer coatings. When a polymer coated steel sample is placed in a standard electrochemical cell, the cell may be modeled as a series of capacitors and resistors existing in a particular series/parallel combination. The EIS test applies a very small alternating voltage (5-10 mV) between the polymer coated steel and a counter electrode, over a very large frequency range (0.01 to 100,000 Hz). Total system impedance is measured as a function of frequency. The total system impedance is composed of the sum of all capacitances and resistances. At very high and very low frequencies, the capacitive components, in essence, can be eliminated, such that the only contributions to impedance are from resistances. At very low frequency, the measured resistance corresponds essentially to the pore resistance, PR, of the coating.

PR is a measure of how easily electrolyte solution can move through the polymer coating to access the metal surface. High PR has been phenomenologically related to good corrosion protection. If a coating can effectively keep water away from the metal, corrosion protection will be good since water presence is essential for corrosion to occur. A natural extension of this concept is that higher PR means better corrosion protection, other things being equal. A major advantage of the EIS technique is that data can be obtained within hours or days, vis-s-vis several days or weeks with immersion testing or salt fog testing. This technique is known to be useful in predicting performance of protective organic coatings applied to combat corrosion. A discussion of the use of EIS to measure corrosion preventing properties of vinyl acrylic latex copolymers and derived paints is given by Paget, et al., Journal of Coatings Technology, 55, No. 698, 39-51 (1983).

Example 1

Cleaned carbon steel panels were coated with a solution of about 5 weight percent PAn in NMP to a coating thickness of about 50 microns. The panels were dried according to the following procedure (values are approximate):

1. 24 hours at 120° C. with nitrogen flush at 25 cm. Hg
2. 24 hours at 120° C. under full vacuum
3. cool to room temperature under full vacuum.

The PAn films on some of the panels were then doped with p-toluene sulfonic acid, PTSA, to make it conductive and others were left in the nonconductive state. These panels and uncoated panels were then immersed in 3% NaCl aqueous solution for about 2 months. The PAn coated panels were then immersed in NMP for about 1 to 2 days to cause the PAn to swell. The swollen PAn was then gently rubbed off taking care not to scrape the steel surface and remove any corrosion that might be present. The presence of corrosion was confirmed by scanning electron microscopy and energy dispersive X-ray spectroscopy analysis and the amount of corrosion was determined visually.

The carbon steel panels coated with nonconductive PAn showed the least amount of corrosion. All of the PAn coated panels showed very little corrosion, but the panels coated with nonconductive PAn showed slightly less corrosion than did the panels coated with protonated (i.e., doped) PAn. This was very surprising in view of the prior art and demonstrated that nonconductive PAn performs as well or better than the doped conductive form of PAn.

Example 2

Carbon steel panels coated with nonconductive PAn prepared as described in Example 1 were treated by air oxidation in which the panels were heated at 110° C. in flowing air for about 3 days. The films on these and on other coated panels prepared as described in Example 1 were examined for pore resistance by EIS in which measurements were made on an area of film of about one square cm. with the film thickness typically about 50 microns. The results are given in Table 1.

TABLE 1

| Polymer Film | Pore Resistance (ohms) |
| --- | --- |
| Nonconductive PAn | $2 \times 10^8$ |
| Conductive PAn | $2 \times 10^6$ (+/− 100%) |
| Air-oxidized PAn | about $5 \times 10^8$ |

A higher pore resistance indicates better corrosion protection performance. Consequently, in these studies the EIS values show that the air-oxidized nonconductive film of PAn offers the best protection, the unoxidized nonconductive film is next best, and the conductive or doped PAn gives the least protection of these three forms of PAn coatings. This observation supports the immersion test results reported in Example 1.

In order to obtain a better appraisal of these pore resistance values, EIS studies were made on samples of two commercial products, Rust-Oleum Spray Enamel and Rust-Oleum Zn-rich Spray Primer. Cleaned carbon steel panels were sprayed with these products and air dried for about 72 hours. The Rust-Oleum Spray Enamel coating had a PR of $8 \times 10^5$ ohms indicating less corrosion protective effectiveness than either of the nonconducting PAn films. The Rust-Oleum Zn-rich Spray Primer showed a PR of about $2 \times 10^3$, but the presence of zinc may have prevented an accurate impedance measurement. Never-the-less, based upon EIS data, nonconductive PAn performs better than the commercially established Rust-Oleum products. In subsequent salt fog testing, the Rust-Oleum products and nonconductive PAn showed comparable performance with significant corrosion within 7 days and complete failure within about 21 days.

Example 3

Evaluations were made of coatings containing nonconductive PAn blended with other miscible polymers which did not alter the nonconductive state of the PAn. A series of studies were done with blends of PAn and a polyimide which is best characterized as an amic acid form of the reaction product of pyromellitic dianhydride and oxydianiline. In this case it was a commercial product of DuPont sold under the name Kapton ML-5019. Solutions were made of each polymer in NMP in 5 weight percent concentrations. Appropriate amounts of each solution were then mixed for about 1 to 2 hours to obtain the desired blend compositions. The polymer blends and each polymer alone were then cast on cleaned carbon steel panels to form cured films having a thickness of about 50 microns. The solvent removal/curing cycle was as follows (values are approximate):

1. 24 hours at 120° C. with nitrogen flush at 25 cm Hg
2. 24 hours at 120° C. under full vacuum
3. 15 hours at 250° C. under full vacuum (omitted for PAn alone)
4. cool to room temperature under full vacuum.

EIS studies of these films gave the results shown in Table 2. Compositions are given in weight ratios. Times are the length of time required for equilibrium in the EIS test to be established. This was usually determined by observation of a steady open circuit voltage.

TABLE 2

| Kapton:PAn | Pore Resistance (ohms) | Times |
| --- | --- | --- |
| 100:0 | $2 \times 10^4$ | 17 hrs. |
| 90:10 | $9 \times 10^6$ | 5 hrs. |
| 75:25 | $6 \times 10^7$ | 40 min. |
| 50:50 | $3 \times 10^6$ | 15 min. |
| 0:100 | $1.5 \times 10^8$ | 10 min. |

The above data clearly show that addition of nonconductive PAn to Kapton improves the PR of this polyimide. On the other hand, solvent resistance of the blends was better than that of the pure PAn. When exposed to NMP, the coatings of pure Kapton and all the blends showed excellent resistance while the pure PAn swelled significantly and underwent some dissolution. This illustrates how blends of PAn with other polymers can achieve certain combinations of properties that neither polymer has alone.

Salt fog and immersion testing were in agreement with the PR measurements. In the salt fog test, pure PAn gave the best protection while pure Kapton had the least, with the blends being intermediate. The salt fog environment was so aggressive that complete corrosion of all samples occurred within about 21 days. In the immersion tests, after about 30 days in 3% NaCl aqueous solution, the pure PAn and the 50:50 and 75:25 blends showed excellent substrate adhesion while pure Kapton showed complete lift-off and the 90:10 blend failed partially. After 60 days, the 90:10 blend failed completely, whereas the 75:25 and 50:50 blends showed small lift-off and blistering. The pure nonconductive PAn gave the best performance with only very minor lift-off. These immersion data highlight the excellent adhesion performance of nonconductive PAn. The better the adhesion of a coating is to a metal substrate, the better will be its protection against corrosion. The coatings which adhere well serve better to prevent ingress of water and other components needed for corrosion to occur. Thus, not only does PAn itself adhere very well to carbon steel, but it improves the adhesion performance of a polyimide such as Kapton.

In the PAn/Kapton blends, reaction occurs between the amine groups of the PAn and the amic acid groups of the Kapton. A mixed solution (50:50) which is 5 percent total polymer in NMP will gel overnight. Moreover, dynamic mechanical analysis results showed good miscibility between Kapton and PAn. Measurement of mechanical properties showed that a 50:50 blend of these polymers is as strong as either polymer alone, indicating no sacrifice of strength in the blends.

One of the attractive properties of Kapton is its thermal stability. Studies were done on a PAn/Kapton blend (1:1) to investigate the effect which PAn has on this property. The blend was made from solution as before, but the drying cycle did not include step 3, the 250° C. heating for 15 hours. This difference should not affect the trends observed. Thermal stability of PAn, Kapton and the blend was measured in terms of percent weight loss upon heating in nitrogen and in air to 200° C., 400° C. and 600° C. using a ramp rate of 10° C./min. Up to 400° C., all systems performed about the same, but at 600° C. significant differences were observed. The PAn/Kapton blend stability was substantially better than PAn alone in nitrogen, and in air the blend stability was as good as Kapton alone. From these data it is concluded that addition of PAn to Kapton can improve corrosion protection without sacrificing the thermal stability advantages of this polyimide.

Example 4

Blend composites of nonconductive PAn and epoxy resin were made and cast on carbon steel panels for evaluation. The epoxy resin was Ciba-Geigy's GY-2600 which is a reaction product of bisphenol-A and diglycidyl ether. Blends were made in PAn:epoxy weight ratios of 1:2 and 2:1 by adding the epoxy to a 5 weight percent solution of PAn in NMP while stirring vigorously for about 1 to 2 hours. The film thickness cast was about 50 microns and the solvent removal/curing cycle was as given in Example 1.

In EIS studies it was found that the pore resistance of the 2:1 PAn/epoxy blend was $2\times10^9$ ohms, which is higher than the value of $2\times10^8$ measured for the pure PAn coating. A benefit is derived from blending epoxy and PAn, not only with respect to PR, but from vastly improved solvent (NMP) resistance as well. The 1.2 PAn/epoxy blend had a PR of $2\times10^6$ ohms, so that the 2:1 ratio clearly gave the better results.

The 2:1 PAn/epoxy blend showed very good salt fog performance over a period of about 8 weeks with only small amounts of corrosion observed around the edges of the panels. Control panels were prepared coated with the same epoxy polymer blended with a standard amine hardener, Ciba-Geigy XU-265, in a 2:1 ratio and a 1:2 ratio of hardener to epoxy. The latter is the ratio of hardener to epoxy generally recommended. The PR value for the 2:1 hardener/epoxy blend was $2\times10^9$ ohms, comparable to that observed for the 2:1 PAn/epoxy blend. The PR for the 1:2 hardener/epoxy blend was $2\times10^5$ ohms which was less than that measured for the 1:2 PAn/epoxy blend.

In the salt fog test the performance of the 2:1 hardener/epoxy blend was comparable to that of the 2:1 PAn/epoxy blend. The 2:1 PAn/epoxy system also showed excellent solvent resistance in NMP. Immersion in NMP for about 48 hours caused neither swelling nor lift-off of coating, whereas the standard hardener/epoxy system did swell and lift-off. Also noted is that the solvent resistance of the 2:1 PAn/epoxy is an unexpected benefit in view of the poor solvent resistance of the 2:1 hardener/epoxy system. In this respect the 2:1 PAn/epoxy blend also performed better than pure PAn which did swell significantly in NMP.

In immersion testing, the 2:1 PAn/epoxy blend showed almost no failure after 60 days, comparable in performance to the pure nonconductive PAn. On the other hand, the 1:2 PAn/epoxy blend did not perform well in the salt fog test, completely rusting within about 7 days, while the standard epoxy system, also in a 1:2 ratio of hardener to epoxy, did very well. In immersion testing, however, (3% aqueous NaCl) both the standard ure-epoxy system (2:1) and the 2:1 PAn/epoxy blend did very well with almost no lift-off observed. Also, the 1:2 PAn/epoxy blend did very well in the solvent resistance test using NMP compared to the pure PAn. From these studies, it was concluded that while the 1:2 PAn/epoxy blend is operable and offers definite advantages, it does not work as well overall as a corrosion barrier as the 2:1 PAn/epoxy composition.

Immersion and salt fog tests are qualitative, unlike EIS which provides a quantitative reading. Performance in these qualitative tests is determined by observation, visually evaluating the rate at which corrosion develops on a sample or the rate at which polymer film degrades or lifts off the substrate it is supposed to protect. The slower these occurrences are, the better the performance. In both these tests the 2:1 PAn/epoxy blend was clearly superior to pure nonconductive PAn and overall slightly superior to the standard hardener/epoxy 2:1 composition. This was confirmed in a more rigorous immersion test by stripping polymer coating from the steel panels after about 5 months of immersion and examining the underlying metal surface. Panels coated with pure nonconductive PAn and PAn/epoxy (2:1) showed slightly less corrosion than the panel protected with the standard hardener/epoxy blend, however, all systems examined showed very good corrosion resistance.

Example 5

Composites were made with nonconductive PAn and a commercial urethane linked diisocyanate, ULDI, (Air Products PPT-95A). The ULDI was added to a 5 percent solution of PAn in NMP with vigorous stirring to make a 1:1 blend, by weight. Reaction clearly occurred because gelation began within about 30 minutes. After applying the composite solution to carbon steel panels, a solvent removal/curing cycle was used as described in Example 1.

In EIS studies, PR of the PAn/ULDI coating was very good, about $1.4\times10^8$ ohms. This compares well to the PR for pure nonconductive PAn. For comparison with ULDI and a standard hardener, methylene dianiline, MDA, a composition of MDA/ULDI was made in a 1:1 mole ratio, coated on a steel panel and tested for PR by EIS. The PR was $6\times10^8$ ohms. This measurement was consistent with results from immersion and salt fog tests in which the PAn/ULDI performance was comparable to that of the MDA/ULDI composition.

In salt fog testing, the PAn/ULDI coating performed very well, not as well as the 2:1 PAn/epoxy blend, but much better than pure PAn or the PAn/polyimide blends. Significant failure was not observed until after about 4 weeks. Solvent resistance of the PAn/ULDI blend in NMP was better than pure PAn, but not as good as the PAn/epoxy blend. In immersion testing (3% by weight NaCl in water) blistering and lift-off were observed for the PAn/ULDI blend after 5 weeks, indicating performance not quite as good as the pure nonconductive PAn or the PAn/epoxy blend. The principal benefits of using a PAn/ULDI blend over pure nonconductive PAn lie in improved solvent resistance, and improved corrosion resistance where a urethane-based coating is preferred.

Example 6

For a more severe evaluation of the nonconductive PAn coatings, a comparison was made with a premium commercial product of Tnemec, Inc. A Tnemec/urethane (Model 90-97) coating had a PR of about $2\times10^4$ ohms and a Tnemec/epoxy (Series 104) coating had a PR of about $4\times10^9$ ohms. Using EIS to measure PR of Tnemec products containing zinc as an inhibitor was not possible because the zinc prevented an accurate impedance measurement. These Tnemec products were diluted, applied and dried following the manufacturer's specifications. In immersion tests and salt fog tests, these products were the best performers, but overall, the comparison clearly indicated that the nonconductive PAn has commercial potential in carbon steel corrosion protection. The reason for the low PR value of the Tnemec/urethane composition is not known, but it is suspected that the EIS sample contained some small pin holes.

Example 7

This example shows that commercial PAn can be used successfully to practice our invention. Allied-Signal offers doped PAn commercially as Versicon conductive polymer. This product was deprotonated by treatment with a large excess of 1 molar ammonium hydroxide to render it nonconductive. This nonconductive PAn was cast from solution onto carbon steel panels alone and in blends with epoxy and ULDI in the manner described in Example 4. The PR of the PAn coating was $1 \times 10^5$ ohms while that of the PAn/epoxy (2:1) was $8 \times 10^6$ and of the PAn/ULDI (1:1) was $5 \times 10^6$. These data show an advantage for such blends in improving the pore resistance for PAn. It was also observed that addition of epoxy or ULDI to the deprotonated Allied-Signal PAn gave improved performance in immersion and salt fog tests, which is in agreement with the EIS measurements.

Example 8

Blends were made of nonconductive PAn and a copolymer of styrene and acrylic acid (80% by weight styrene) in a 1:1 weight ratio. Steel panels were coated as in Example 1. PR by EIS measurement for this blend was about $1.4 \times 10^7$ ohms, in contrast to a PR for the plain copolymer of about $3 \times 10^4$ ohms. Although the PAn clearly brings a benefit to this acid copolymer, the performance of these blends was not outstanding when compared to the other PAn blends described in the prior Examples. The addition of PAn to styrene/acrylic acid copolymer improved immersion test performance over plain copolymer but gave no improvement in salt fog testing.

The above Examples show that nonconducting poly(aniline) can be blended with other polymer systems to improve the corrosion resistance performance of those polymers. Protective coatings of excellent quality can be formed from such blends on carbon steel. The nonconducting poly(aniline) can also function as a hardener for epoxy polymers and urethane linked diisocyanates. Coatings formed from these two types of compositions are of high quality and show very good corrosion prevention and solvent resistance.

The results reported here were quite surprising in view of the art in this field which places great emphasis upon the conducting properties of protonated PAn in corrosion prevention. While not to be bound by theory, one possible explanation of why nonconductive PAn functions as it does is that with a film of PAn on a metal surface, the entire surface is in contact with aniline mer units. The corrosion reaction is fostered by acidic conditions but aniline by itself is a corrosion resistant additive. When a metal surface is exposed to aniline liquid or vapor, aniline tends to scavenge protons near the metal surface, thereby inhibiting the corrosion reaction. It could be that aniline, even in its polymerized state, can still function in this way. Also, PAn forms coherent, dense films which can work in restricting access of corrosive elements such as water to the metal surface, thereby further inhibiting the corrosion reaction.

Other embodiments of our invention will be apparent to those skilled in the art form the foregoing disclosure without departing from the spirit or scope of the invention.

We claim:

1. A method of protecting carbon steel from corrosion which comprises applying to a carbon steel surface a coating of nonconducting poly(aniline) to form a coated carbon steel surface and, without protonation, exposing the resultant coated carbon steel surface to an environment which is corrosive for untreated carbon steel.

2. The method of claim 1 wherein said poly(aniline) has been prepared chemically and said coating is cast from a polymer solution.

3. The method of claim 2 wherein said coating is subjected to an air oxidation treatment before exposing it to said corrosive environment.

4. The method of claim 2 wherein said polymer solution contains both poly(aniline) and an additional polymer or oligomer which is miscible or reactive with poly(aniline) and soluble in the same solvent as poly(aniline).

5. The method of claim 4 wherein said poly(aniline) is present in a concentration of at least 5% by weight with respect to said additional polymer or oligomer.

6. The method of claim 4 wherein said poly(aniline) is present in a concentration of at least 50% by weight with respect to said additional polymer or oligomer.

7. The method of claim 4 wherein said additional polymer or oligomer is a polyimide.

8. The method of claim 4 wherein said additional polymer or oligomer is an epoxy resin.

9. The method of claim 4 wherein said additional polymer or oligomer is a urethane linked diisocyanate.

* * * * *